(12) United States Patent
Schlegel et al.

(10) Patent No.: US 8,152,110 B2
(45) Date of Patent: Apr. 10, 2012

(54) SENSOR SYSTEM FOR MONITORING THE SYNCHRONISM OF CONTROL SURFACES OF AN AIRCRAFT

(75) Inventors: Robert Schlegel, Langenargen (DE); Juergen Riech, Friedrichshafen (DE)

(73) Assignee: Liebherr-Aerospace Lindenberg GmbH, Lindenberg (DE)

( * ) Notice: Subject to any disclaimer, the term of this patent is extended or adjusted under 35 U.S.C. 154(b) by 323 days.

(21) Appl. No.: 12/517,790

(22) PCT Filed: Sep. 29, 2008

(86) PCT No.: PCT/EP2008/008273
§ 371 (c)(1),
(2), (4) Date: Jun. 4, 2009

(87) PCT Pub. No.: WO2009/043568
PCT Pub. Date: Apr. 9, 2009

(65) Prior Publication Data
US 2010/0064823 A1    Mar. 18, 2010

(30) Foreign Application Priority Data
Sep. 28, 2007  (DE) .......................... 10 2007 046 707

(51) Int. Cl.
*B64C 9/00* (2006.01)
*B64C 13/30* (2006.01)
*B64C 13/00* (2006.01)

(52) U.S. Cl. ........ 244/233; 244/232; 244/215; 244/213; 244/214

(58) Field of Classification Search .......... 244/213–216, 244/232
See application file for complete search history.

(56) References Cited

U.S. PATENT DOCUMENTS

| 3,169,178 | A | | 2/1965 | Notchev et al. |
| 4,181,276 | A | * | 1/1980 | Kogure et al. ................ 244/215 |
| 4,686,907 | A | | 8/1987 | Woollam et al. |
| 4,789,119 | A | * | 12/1988 | Bellego et al. ................ 244/226 |
| 5,680,124 | A | | 10/1997 | Bedell et al. |
| 6,299,108 | B1 | * | 10/2001 | Lindstrom et al. ............ 244/213 |
| 6,930,489 | B2 | * | 8/2005 | Schievelbusch et al. ..... 324/503 |
| 7,338,018 | B2 | * | 3/2008 | Huynh et al. ................ 244/215 |
| 7,891,611 | B2 | * | 2/2011 | Huynh et al. ................ 244/215 |
| 2004/0056147 | A1 | | 3/2004 | Uchida et al. |
| 2005/0051671 | A1 | | 3/2005 | Djuric |
| 2008/0265090 | A1 | * | 10/2008 | Schievelbusch ............. 244/99.3 |

FOREIGN PATENT DOCUMENTS

EP  0831027  3/1998
EP  1088753  4/2001

OTHER PUBLICATIONS

ISA German Patent and Trademark Office, Search Report of DE 10 2007 046 707.0, Mar. 2, 2010, 4 pages.
ISA EPO; International Search Report of PCT/EP2008/008273; Feb. 16, 2009; The Netherlands.

* cited by examiner

*Primary Examiner* — Lisa Caputo
*Assistant Examiner* — Jonathan Dunlap
(74) *Attorney, Agent, or Firm* — Alleman Hall McCoy Russell & Tuttle LLP

(57) ABSTRACT

The present invention relates to a sensor system for monitoring the synchronism of control surfaces of an aircraft with two transmission links for the mechanical transmission of the movements of one or more control surfaces to at least one sensor, wherein the two transmission links are coupled with each other mechanically and/or via the at least one sensor, whereby a difference between the movements transmitted by the transmission links can be monitored.

19 Claims, 6 Drawing Sheets

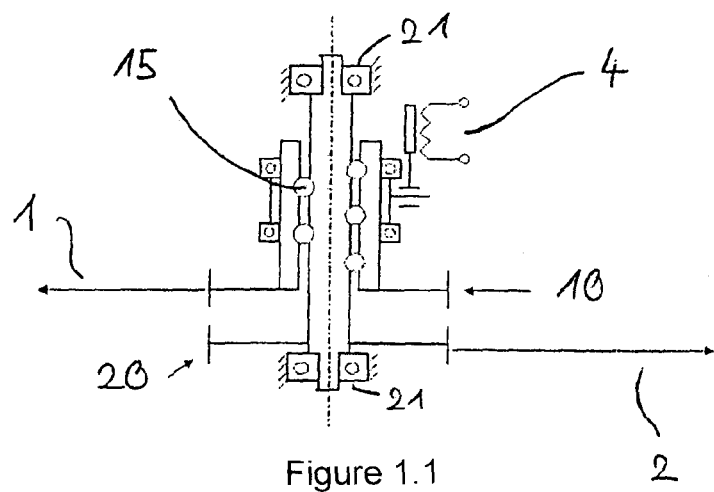
Figure 1.1
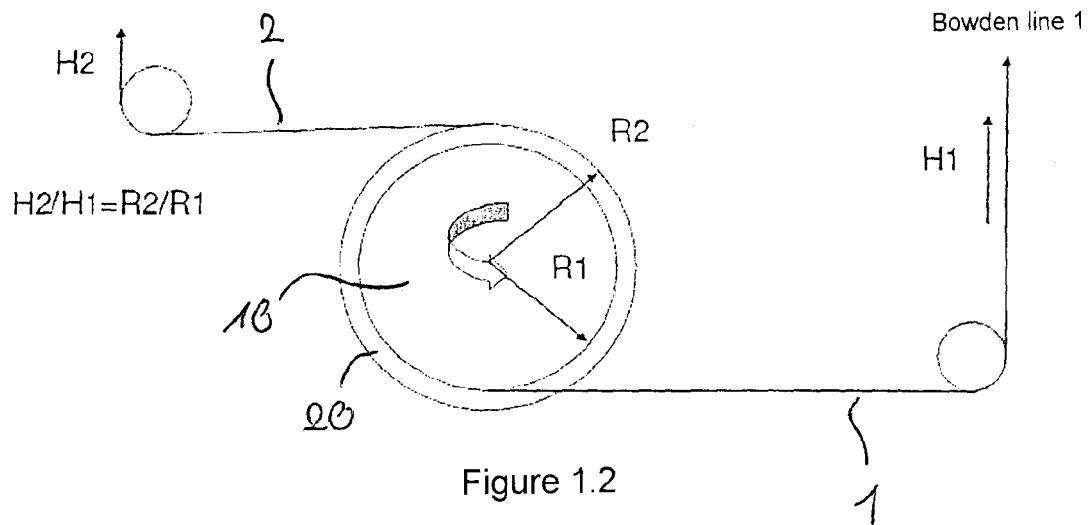
Figure 1.2

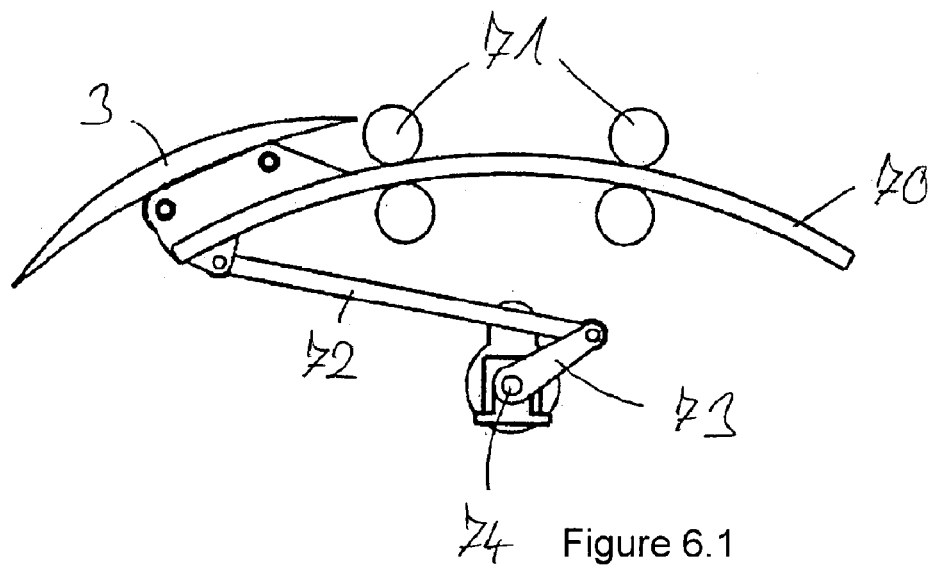
Figure 6.1
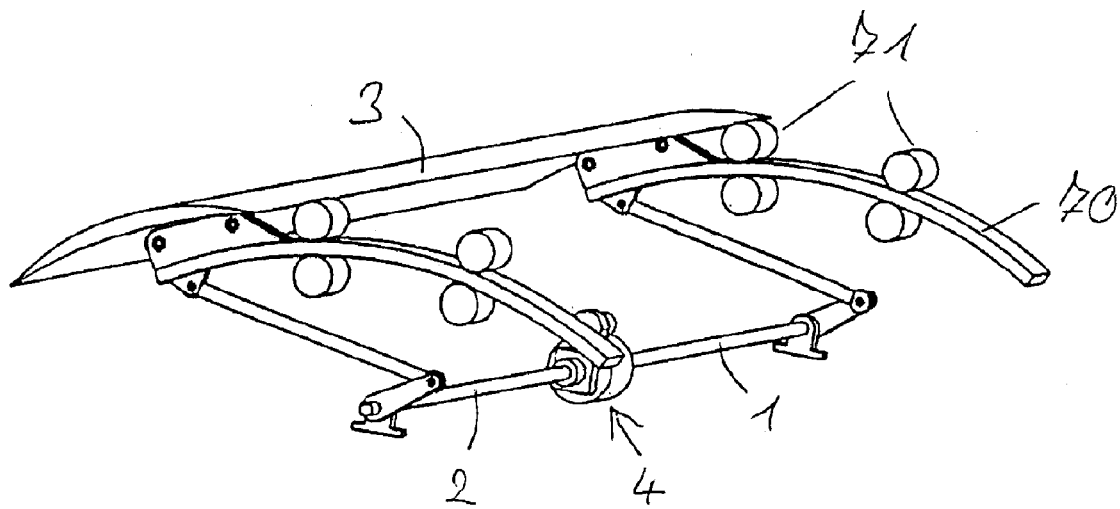
Figure 6.2

SENSOR SYSTEM FOR MONITORING THE SYNCHRONISM OF CONTROL SURFACES OF AN AIRCRAFT

CROSS-REFERENCE TO RELATED APPLICATIONS

This is the U.S. National Phase of International PCT Application Ser. No. PCT/EP2008/008273, filed Sep. 29, 2008, which claims priority to German Patent Application No. 10 2007 046 707.0, filed on Sep. 28, 2007, both of which are hereby incorporated by reference in their entirety for all purposes.

FIELD

The present invention relates to a sensor system for monitoring the synchronism of control surfaces of an aircraft with two transmission links for the mechanical transmission of the movements of one or more control surfaces to at least one sensor.

BACKGROUND AND SUMMARY

Such sensor systems are used for monitoring the correct function of control surfaces, in particular, on the wings of an aircraft. For influencing the lift and drag coefficients of the wings, airplanes are equipped with control surfaces such as slats and landing flaps, which change the aerodynamic properties of the wings such that for starting and landing the aircraft has slow-flying properties, whereas in cruise flight the desired fast-flying properties are achieved by correspondingly positioning the control surfaces such as the slats and landing flaps.

Malfunctions in the drive system of these control surfaces can lead to the so-called skewing, misalignment or loss of individual control surface segments, whereby the aerodynamic properties of the wings are impaired in an undesired way. In particular, undesired rolling or yawing moments or also consequential damages can occur upon loss of individual control surface segments.

To detect such malfunctions in good time and stop the course of the damage, sensor systems are known, which should detect skewing or asynchronism or the loss of individual control surface segments in good time. If an error is detected, a signal is generated, which leads to the stop of the drive system and provides a corresponding warning signal to the cockpit crew.

From U.S. Pat. No. 4,686,907, a sensor system is known in which marks are arranged on a bent track, which is guided in guide rollers and upon movement causes an arc-shaped movement of the flap body. During a movement of the track, these marks move past laterally arranged sensors and thus generate signals, by means of which the position of the flap can be detected. This system has a variety of applications, but requires a large number of sensors.

From U.S. Pat. No. 5,680,124, there is furthermore known a sensor system in which a Bowden line is arranged within a row of flap bodies of a wing, which are located one beside the other. The ends of the Bowden line are attached to the first and to the last flap body, so that the length of this Bowden line remains constant when all flaps move in synchronism. On the other hand, an asynchronous movement of adjacent flaps increases the length of the Bowden line, which is detected by a corresponding sensor. However, this system only can detect an asynchronous movement of adjacent flaps, whereas a disturbed movement of the inner and outer flap ends is not detected. Monitoring an individual flap neither is possible with this arrangement.

In addition, the wings of modern passenger airplanes frequently have a wing depth which is decreasing from the inside to the outside (tapered wings), which often results in different travel distance distances in terms of span for landing flaps and slats, i.e. the inboard flaps have a greater travel distance distances than the outboard flaps. There are also arrangements which require different travel distance distances of the drive stations of a single flap. Such differences of the desired travel distance distances of the flaps can, however, not be taken into account by known sensor systems, or only with great effort.

Therefore, it is the object of the present invention to provide a sensor system for monitoring the synchronism of control surfaces of an aircraft, which can be used for a variety of applications with little constructive effort and in particular also can account for different desired travel distance distances of the control surfaces. Furthermore, a safe and reliable monitoring of synchronism should be possible, wherein in particular a self-monitoring construction is desired.

In accordance with the invention, this object is solved by a sensor system according to the present invention. Such sensor system for monitoring the synchronism of control surfaces of an aircraft comprises two transmission links for the mechanical transmission of the movement of one or more control surfaces to at least one sensor, wherein the two transmission links are coupled with each other mechanically and/or via the at least one sensor, whereby a difference between the movements transmitted by the transmission links can be monitored. By using two mechanical transmission links it is possible to monitor the synchronism of one or more control surfaces in a safe and simple way by monitoring the difference between the movements transmitted by the transmission links. To provide for this difference measurement, the two transmission links are coupled with each other mechanically and/or via the at least one sensor, so that a constructively simple and yet reliable monitoring becomes possible. In particular, a multitude of sensors thus can be omitted. Furthermore, the system is self-monitoring, since a breakage of one of the two transmission links is detected as an error.

The mechanical transmission links can transmit the movement of individual or several regions of a single control surface, so that e.g. the travel distance distance of a control surface in the left-hand region can be compared with the travel distance distance of the same control surface in the right-hand region. Alternatively, the two transmission links also can engage different control surfaces, so that the synchronism of two control surfaces can be monitored.

Advantageously, coupling the transmission links is effected via one or more rotatively movable coupling elements. By converting the translational movement of the control surfaces into a rotational movement, monitoring the difference between the movements transmitted by the transmission links is simplified considerably, wherein the rotatively movable coupling elements also require only little packaging space.

Furthermore advantageously, different desired travel distance distances are compensated in accordance with the invention by corresponding different transmission ratios of the movements transmitted by the transmission links to one or more coupling elements. Thus, if the control surfaces have different desired travel distance distances on different points of one or more control surfaces due to the decreasing wing depth described above, this can be taken into account in that the movements transmitted from these points of the control surfaces by the transmission links are transmitted to the coupling element(s) with different transmission ratios. By corresponding adjustment of the transmission ratios, the desired travel distance difference, which occurs with an error-free movement of the control flaps, can be taken into account automatically. By means of the different transmission ratios it thus can be ensured that the difference monitored by the sensor is zero in the trouble-free case and only differs from zero in the case of a malfunction. This provides for an easy adaptation of the sensor system of the invention to all kinds of tasks and control flaps in a purely mechanical way. In particular, complicated evaluation electronics thus can be omitted, since the compensation of the different travel distances can only be achieved mechanically.

Furthermore advantageously, the two transmission links in the sensor system of the invention engage two coupling elements movable against each other, whose relative movement is monitored by a sensor. As a result, only one sensor must be used, which monitors the synchronism. Deviations from the desired travel distance of the control surfaces lead to a relative movement between the two coupling elements movable against each other, which can be detected safely and easily.

Alternatively, the two transmission links also can engage an inherently rigid coupling element, wherein two sensors are provided, which monitor the forces transmitted by the transmission links. In the case of a trouble-free movement of the control surfaces, the two transmission links move the common coupling element in the same way, so that constant forces are acting here. In the case of an asynchronous movement, however, at least one of the transmission links is loaded with higher or lower forces, which then are detected by the sensors.

In an advantageous embodiment of the sensor system of the invention, the two transmission links each comprise a Bowden line. The same advantageously is arranged such that in the case of a movement of the control surface or control surfaces, the length of the Bowden line is changed. By means of such Bowden lines, a multitude of sensor arrangements can be realized, which can monitor the travel distances of both one and several control surfaces.

Advantageously, the cables of the two Bowden lines are reeled up on one or more drums on at least one end. When the length of the Bowden line path is increased or reduced by a movement of the control surface or control surfaces, the cables accordingly are reeled off from the drum or reeled up onto the drum. The drum or drums advantageously are arranged on the wing structure, so that the Bowden line path is changed in its length in the case of a change in position of the control surfaces with respect to the wing structure. For this purpose, the cables either each are attached to a control surface with their other end or extend along the control surface or control surfaces via deflection pulleys, before they are attached to the wing structure at some other point. Hence it is possible to realize a multitude of different possibilities for monitoring the position of the control surfaces.

Advantageously, the Bowden lines are tensioned by one or more return springs of the one or more drums. The return springs thus ensure that the cables of the Bowden lines are again reeled up onto the drums, when the length of the Bowden line path is reduced by a movement of a control surface. In the case of a breakage of the cable, this also leads to a response of the sensor, so that a self-monitoring system is created.

In accordance with the invention, the cables of the two Bowden lines advantageously are reeled up on the drums in opposite directions. By such winding of the cables in opposite directions it is achieved that the change in length of the Bowden lines is effected in the same way during a rotation of the drum or drums, i.e. that either both Bowden lines become longer or both Bowden lines become shorter. This results in an easy monitoring of the difference of the movements transmitted by the two Bowden lines.

Furthermore advantageously, the cables of the two Bowden lines are reeled up onto drums or drum regions with a different diameter. By means of drums or drum regions with a different diameter, a different conversion of the longitudinal movement transmitted by the Bowden lines into a rotational movement of the drums can be achieved, so that different desired travel distances can be compensated. Due to the different diameters, there is thus obtained a particularly simple mechanical possibility for taking into account different travel distances. In particular, complicated evaluation electronics can be omitted, since the compensation of the different travel distances can be achieved by the different diameters alone.

In an advantageous embodiment, the cables of the two Bowden lines are reeled up onto a common drum, wherein cable force sensors are integrated in the cables. The common drum thus ensures a mechanical coupling of the Bowden lines, in which in the case of a proper synchronous movement of the control surfaces the two cables are in an equilibrium of forces with the return spring of the drum and are uniformly loaded by the same. In the case of an asynchronous movement, however, one of the two cable force sensors is loaded less or more, whereby the error then can be detected. Advantageously, an error is detected via a lower load.

Advantageously, the cable force sensors include a spring and a sensor which monitors a change in length of the spring. In trouble-free operation, the spring of the cable force sensor has a certain length which results from the equilibrium of forces with the return spring of the drum. In the case of a lower or higher load of the spring of the cable force sensor, however, the spring becomes shorter or longer, which is detected by the sensor. Advantageously, an error is detected by the spring becoming shorter.

Alternatively, the two Bowden lines advantageously can also be reeled up on two separate drums, wherein the sensor monitors a difference in angle between the drums. With only one sensor, synchronism can easily be monitored here. In the case of synchronism, the two drums move in the same way, whereas in the case of an error, a difference in angle occurs between the movement of the two drums, which is detected by the sensor.

Advantageously, the drums are coaxially arranged one beside the other. This provides simple possibilities for monitoring the difference in angle between the two drums. For instance, the drums can be configured as a spindle-nut unit, so that a different rotation of the drum results in a lifting movement, which actuates a sensor. The sensor unit can also be e.g. an inductive proximity sensor, which is mounted on the side of the structure and by means of marks, so-called targets, on the periphery of the drums incrementally detects the synchronous movement of the drum by pulse width measurement. In a further advantageous configuration of the sensor unit, e.g. a proximity sensor can be arranged on the one drum, which detects marks on the opposed second drum. In the case of a synchronous movement, a permanent "target-near" signal thus is obtained, which is interrupted in a case of error.

In a further advantageous embodiment of the sensor system of the invention, the transmission links transmit a rotational movement, in particular via a revolving tube or a flexible shaft. This provides a mechanically simple possibility for transmitting the movement of the control surfaces to the sensor. For instance, the revolving tube or the flexible shaft can transmit the movement of a control surface element via a toothed rack or gear wheel arrangement.

Advantageously, the sensor monitors a difference in angle between the rotational movements transmitted by the transmission links. Similar to the configuration with two separate drums, an asynchronism in the movements transmitted by the two transmission links thus can easily be detected.

To compensate different desired travel distances, transmissions with different gear ratios advantageously are provided in the two transmission links. This also provides a simple mechanical possibility for adapting the sensor system of the invention to different travel distances.

The sensor system of the invention can be used in a multitude of control surface arrangements, wherein the synchronism of different elements can be checked by the difference measurement in accordance with the invention.

Thus, the transmission links can transmit the movements of a single control surface taking place at different points. In this way, it can be checked for instance whether the one side of a control surface is moved in synchronism with the other side of the control surface. In particular when a plurality of drives are provided for moving a control surface, the proper operation of the drives can be checked in this way.

Alternatively, the transmission links transmit the movements of at least two different control surfaces, in particular of at least two symmetrically moved control surfaces. In this way, for instance, the synchronism of two control surfaces arranged symmetrically with respect to the longitudinal axis of the aircraft on both wings can be monitored.

Furthermore advantageously, each transmission link also can transmit the movement of a plurality of control surfaces. This can be done in particular in that a Bowden line of the invention is drawn through a plurality of control surfaces, so that asynchronous movements of the control surfaces likewise can be monitored.

BRIEF DESCRIPTION OF FIGURES

The present invention will now be explained in detail with reference to embodiments and the drawings, in which:

FIG. 1.1 shows a horizontal section through a sensor arrangement in accordance with a first embodiment of the present invention, FIG. 1.2 shows a vertical section through the sensor arrangement in accordance with the first embodiment.

DETAILED DESCRIPTION

Figure 2:
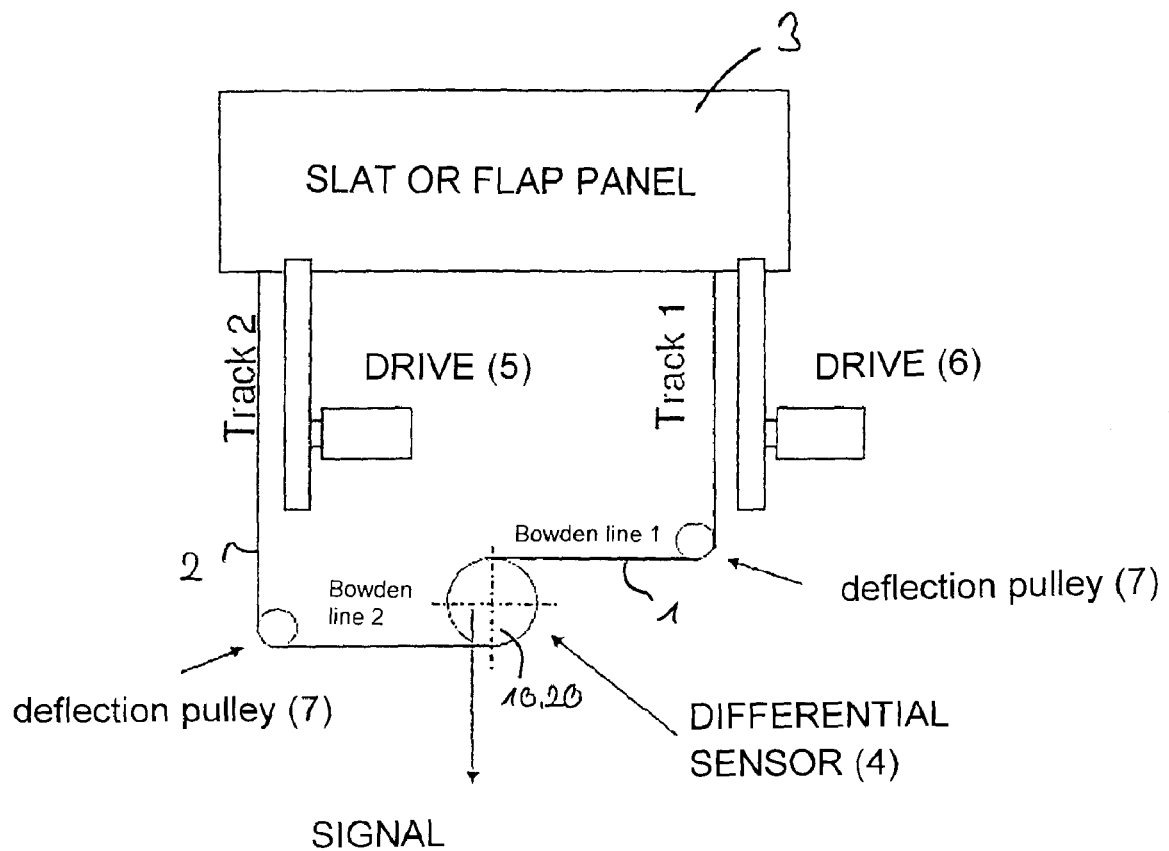
FIG. 2 shows an embodiment of the sensor system of the invention, which is used on a single control surface.

The first embodiment of a sensor unit of the invention as shown in FIGS. 1.1 and 1.2 substantially is based on the direct measurement of travel distance differences with only one sensor 4. There are provided two Bowden lines 1 and 2, which act on one or more flaps on the aircraft wings. One end of the cable of the Bowden line mechanism 1 is reeled up onto a first drum 10, the other end is connected with the control surface or control surfaces. One end of the cable of the second Bowden line 2 likewise is reeled up onto a second drum 20. The first drum 10 and the second drum 20 are biased via return springs, wherein the cables each are reeled up onto the drums by the force of the springs. The cables are reeled up onto the cable drums 10 and 20 in opposite directions, so that the drums 10 and 20 are moved in the same direction when the length of the Bowden line path is increased.

As can be taken from FIG. 1.2, the drums 10 and 20 have different radii R1 and R2, in order to compensate different desired travel distance distances of the flaps transmitted by the Bowden lines 1 and 2. The two drums are arranged coaxially with respect to each other, and the radii R1 and R2 are determined with respect to the desired travel distance distances H1 of Bowden line 1 and H2 of Bowden line 2 such that with a trouble-free movement of the flap the two drums 10 and 20 are rotated with the same angle of rotation. For this purpose, the radii R1 of the first drum 10 and R2 of the second drum 20 are adjusted with respect to the desired travel distance distances H1 of the first Bowden line 1 and H2 of the second Bowden line 2 as H2/H1=R2/R1. With a trouble-free movement of the flap, there is no difference in the angle of rotation between the reels 10 and 20. An error, however, generates an asynchronous movement of Bowden line 1 and Bowden line 2, which correspondingly leads to a difference in the angle of rotation between the reel 10 and the reel 20. This difference in the angle of rotation can then be detected by the sensor 4.

As shown in FIG. 1.1, for instance, the sensor unit can comprise a spindle-nut unit, whose nut is rotated by the drum 10, and whose spindle mounted in bearings 21 is rotated by the second drum 20. A different rotation of the drums thus results in a lifting movement of the nut, which actuates the sensor 4.

The sensor unit can also be e.g. an inductive proximity sensor, which is mounted on the side of the structure and incrementally detects the synchronous movement of the drums by means of marks, so-called "targets", on the periphery of the drum by pulse width measurement.

Another embodiment of the sensor unit can consist for instance of a proximity sensor on the one drum and a target positioned opposite on the second drum. In the case of a synchronous movement, a permanent "target-near" signal thus is obtained, which is interrupted in the case of error. A modification of this arrangement can provide a proximity sensor on a drum in the middle between two targets on the second drum. In the case of different movements of the drum, a "target-near" signal thus is obtained, whereas in the case of a synchronous movement the signal always remains "target-far". The second arrangement, however, has the disadvantage that a defective sensor is not recognized. The first arrangement, on the other hand, has the advantage that the system is self-monitoring.

In the sensor system of the invention, the spring mechanisms have a resetting effect on the drums 10 and 20 and thus produce a tensile stress in each cable. Upon extension of the flap or flaps, the respective spring is biased further via the extended cables of the Bowden lines 1 and 2. As shown above, different travel distances of the drive station can be compensated by a corresponding adaptation of the drum diameters of the drums 10 and 20, so that both drums rotate synchronously in the case of an error-free operation. Upon refraction of the flap, the springs turn back the drums and the cables are reeled up again.

In the case of a malfunction, the movement of the respective cable strand is changed irregularly, which is transferred to the movement of the corresponding drum. This results in a difference of the drum rotation, which is detected by the sensor 4. The sensor now generates an error signal.

A breakage of one of the cables likewise is detected as an error, since the drum associated to the defective cable is reset by the spring mechanism and the sensor mechanism responds. Hence, the system is self-monitoring.

FIG. 2 now shows a sensor system in accordance with the invention, which is used for checking the synchronism of two drives 5 and 6 of a single flap 3. The cables of the Bowden lines 1 and 2 each are attached to the flap 3 with one end and extend along the drive path of the drives 5 and 6, so that the length of the Bowden line substantially corresponds to the length of travel distance of the respective drive. The other ends of the cables of the Bowden lines 1 and 2 extend over deflection pulleys 7 to the drums of the sensor unit of the invention. Different desired travel distance distances of the drives 5 and 6 can be compensated by different radii of the drums 10 and 20, as described with reference to FIG. 1.2.

In the case of a malfunction in one of the flap drives, such as e.g. jamming or breakage, the movement of the drive station concerned is changed irregularly, wherein the cable associated to this station transmits the disturbed movement to its drum. This results in a difference of the drum rotation, which is detected by the sensor 4. Hence, the synchronism also of only a single flap 3 can be monitored by the illustrated arrangement.

Figure 3:
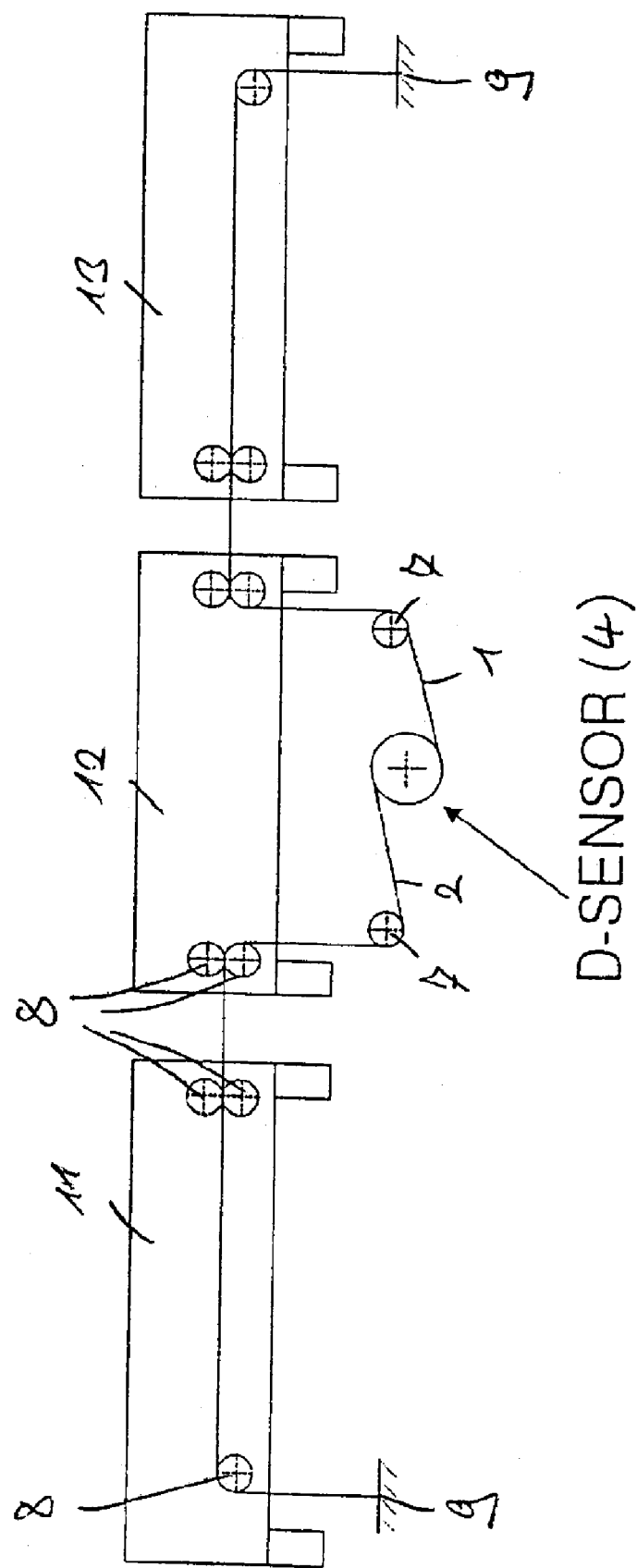
FIG. 3 shows an embodiment of the sensor system of the invention, which is used with a plurality of control surfaces.

In the embodiment shown in FIG. 3, however, the synchronism of a plurality of control surfaces is monitored. For this purpose, the effect of the change of the path of installation of the Bowden line is utilized for detecting asynchronous movements, wherein the cable ends are attached to the structure of the wing on one side and act on the difference sensor 4 with the other side. In this arrangement, the reeled cable length is at least twice as long as the maximum stroke of the flap. This arrangement also provides for monitoring the outer drive stations, which are adjacent to the fixed structure. This arrangement also is self-monitoring, since a breakage of the cables leads to a corresponding resetting of the drum, whereby the sensor mechanism responds.

Like in the embodiments shown above, the sensor unit 4 is arranged on the wing structure. The Bowden lines 1 and 2 then extend over deflection pulleys 7 on the wing structure and via deflection pulleys 8 on the control surfaces along the control surfaces, and their other ends again are attached to mounting points 9 of the wing structure. The Bowden line 1 extends over the right-hand side of the middle flap 12 and over both sides of the right-hand flap 13, whereas the Bowden line 2 extends over the left-hand side of the middle flap 12 and over both sides of the left-hand flap 11. By means of this arrangement, a wide variety of asynchronisms in the movement of the three flaps can be monitored via the difference sensor 4, when they lead to a difference in length of the Bowden lines between the first Bowden line 1 and the second Bowden line 2.

In a further aspect of the invention, the synchronism of all flaps on the leading edge or on the trailing edge of both wings can be monitored with at least one or with two sensor systems as described above, by maintaining all advantages described above. In such an arrangement, in which changes in position of corresponding flaps of both wings are compared, a compensation of different travel distances is not necessary, since the sum of the changes in position of both wings is the same.

Figure 4:
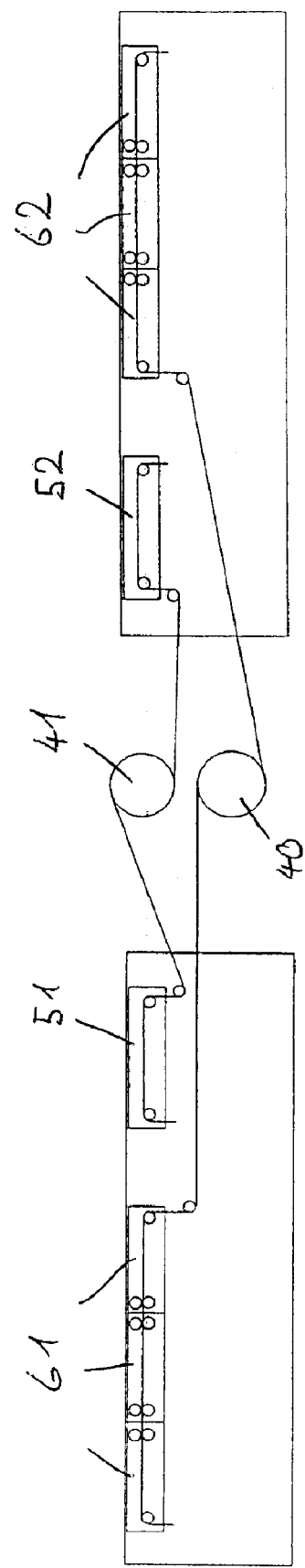
FIG. 4 shows two embodiments of the sensor system of the invention, which are each used with a plurality of control surfaces.

FIG. 4 shows such an arrangement with two sensor systems 40 and 41 in accordance with the invention, which monitors the synchronism of flaps arranged on both wings symmetrically with respect to the longitudinal axis of the aircraft. The sensor unit 41, whose first Bowden line extends over the flap 51 and whose second Bowden line extends over the flap 52, checks the synchronism of these two flaps 51 and 52. On the other hand, the sensor unit 40, whose first Bowden line simultaneously extends through the three flaps 61 and whose second Bowden line simultaneously extends through the three flaps 62, monitors the synchronous movement of the flaps 61 as compared to the flaps 62.

Here, a multitude of further possibilities are conceivable, as to how the synchronism of different flap combinations can be checked by different guidance of the two Bowden lines.

Figure 5:
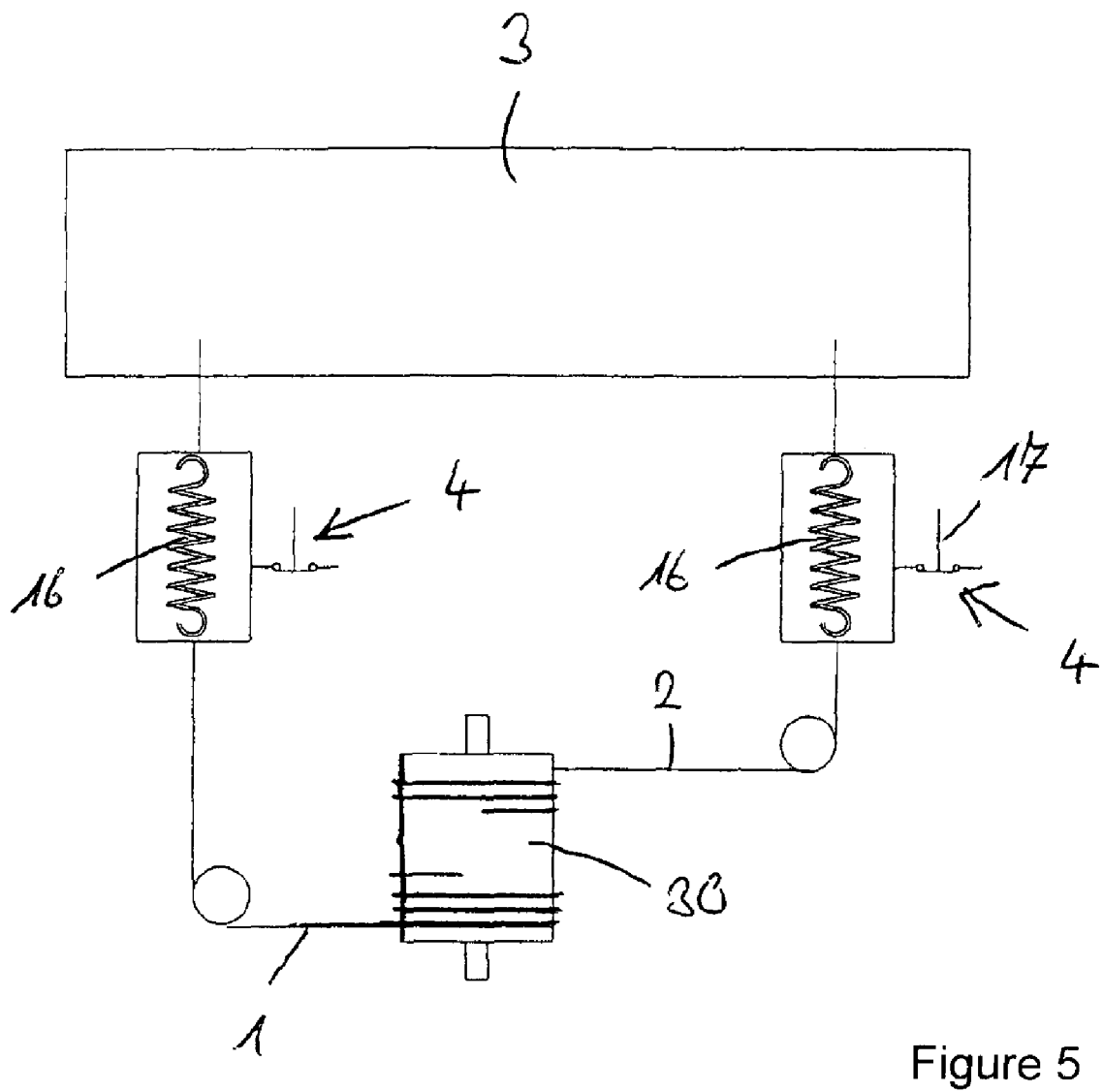
FIG. 5 shows a second embodiment of the sensor unit of the invention, FIG. 6.1 shows a side view of a third embodiment of the sensor unit of the invention, and FIG. 6.2 shows a perspective view of the third embodiment of the sensor unit of the invention.

FIG. 5 now shows a second embodiment of the sensor unit of the invention, in which the cables of both Bowden lines 1 and 2 are reeled up onto a single drum 30 in opposite directions. Due to the use of one drum only, a difference in the angle of rotation no longer is possible. In this arrangement, too, different travel distances of the flap drives of the flap 3 can, however, be compensated by adaptation of the reel diameters on the drum 30.

In accordance with the invention, a sensor unit 4 is integrated in each of the cables, which effects a constant cable tension by means of a biased tension spring 16. The cable forces applied by the springs 16 are in equilibrium with the restoring force of the cable drum, so that in the case of a movement of the control surface 3, the cables are reeled up and off correspondingly. On the sensor units 4, an electrically switching element 17 is mounted, which is closed in a stretched position of the spring 16 and is electrically interrupted when the spring is contracted in a case of error.

In the case of a unilaterally decreasing cable tension as a result of an asynchronous flap movement, the cable tension initially is maintained by the sensor spring 16, but the stroke of the spring element is reduced. This spring stroke is used for actuating the electric signal generator 17, e.g. a switch, a proximity sensor or a distance sensor. The signal generator generates an electric signal, which in turn effects an automatic deactivation of the drive system and an error message in the cockpit.

With this second embodiment of the sensor system of the invention it is also possible to realize all arrangements of the cabling as described above in FIGS. 2 to 4. This embodiment also is self-monitoring.

A third embodiment of the sensor system of the invention now is shown in FIGS. 6.1 and 6.2. There is illustrated a flap guiding mechanism for a flap body 3, which comprises a bent track 70, which is guided in guide rollers 71 and which upon movement causes an arc-shaped movement of the flap-body 3. The elements of the drive systems are not shown for a better clarity.

In the illustrated embodiment, other than in the first and second embodiments, the transmission links do not consist of a Bowden line, but transmit a rotary movement. For this purpose, a lever mechanism of levers 72 and 73 initially is provided, which convert a movement of the flap body 3 via the bent track 70 into a rotary movement of the axle 74. The two sensor transmissions 1 and 2, which are connected with the right and left tracks of the wing flap, are coupled with a sensor element 4 which detects a difference in the angle of rotation between the sensor transmission 1 and the sensor transmission 2. The sensor transmissions can be configured as a revolving tube or advantageously also as a flexible shaft. The flexible shaft offers advantages during installation. This arrangement also is self-monitoring.

The sensor element 4 can be e.g. a rotary position sensor, whose stator is moved by the one sensor transmission and whose rotor is moved by the second sensor transmission. The sensor unit can, however, also consist for instance of a proximity switch and target moved in synchronism via the sensor transmission. Electromechanical switches and trip cams also are conceivable. Moreover, the sensors illustrated with respect to the first embodiment likewise can be used.

With the sensor system in accordance with the invention it is possible to provide a safe and easy monitoring of the synchronism of the control surfaces by comparing the movement of one or more control surfaces, which is transmitted by the two transmission links, without a multitude of sensors or complex evaluation electronics being necessary for this purpose. In addition, an automatic self-monitoring of the system is obtained.

The invention claimed is:

1. A sensor system for monitoring the synchronism of control surfaces of an aircraft with two transmission links for mechanical transmission of movements of one or more control surfaces to at least one sensor, wherein the two transmission links are coupled with each other mechanically and/or via the at least one sensor, whereby a difference between the movements transmitted by the transmission links is monitored, and wherein different desired travel distances are compensated by corresponding different transmission ratios of the movements transmitted by the transmission links to one or more coupling elements.

2. The sensor system according to claim 1, wherein the transmission links are coupled via one or more rotatively movable coupling elements.

3. The sensor system according to claim 1, wherein the two transmission links engage two coupling elements movable against each other, whose relative movement is monitored by the sensor.

4. The sensor system according to claim 1, wherein the two transmission links engage an inherently rigid coupling element and two sensors are provided, which monitor forces transmitted by the transmission links.

5. The sensor system according to claim 1, wherein the two transmission links each comprise a Bowden line.

6. The sensor system according to claim 5, wherein cables of the two Bowden lines are reeled up on one or more drums on at least one end.

7. The sensor system according to claim 6, wherein the Bowden lines are tensioned by one or more return springs of the one or more drums.

8. The sensor system according to claim 6, wherein the cables of the two Bowden lines are reeled up on the drum or drums in opposite directions.

9. The sensor system according to claim 6, wherein the cables of the two Bowden lines are reeled up on drums or drum regions with different diameters.

10. The sensor system according to claim 6, wherein the cables of the two Bowden lines are reeled up on a common drum on the at least one end, and the at least one sensor includes a plurality of cable force sensors integrated in the cables.

11. The sensor system according to claim 10, wherein the cable force sensors include a spring and a sensor, which monitors a change in length of the spring.

12. The sensor system according to claim 6, wherein the cables of the two Bowden lines are reeled up on two separate drums on at least one end, and the sensor monitors a difference in angle between the drums.

13. The sensor system according to claim 12, wherein the drums are coaxially arranged one beside the other.

14. The sensor system according to claim 1, wherein the transmission links transmit a rotational movement, via a revolving tube or a flexible shaft.

15. The sensor system according to claim 14, wherein the sensor monitors a difference in angle between the rotational movements transmitted by the transmission links.

16. The sensor system according to claim 1, wherein the transmission links transmit movements of a single control surface, wherein the movements of the single control surface occur at different points.

17. The sensor system according to claim 1, wherein the transmission links transmit movements of at least two different control surfaces.

18. The sensor system according to claim 1, wherein each transmission link transmits the movements of the one or more control surfaces.

19. A system, comprising:
a first control surface of an aircraft;
a second control surface of the aircraft, the first and second control surfaces being symmetrically moved control surfaces;
a sensor system including at least one sensor, the sensor system monitoring synchronism of the first and second control surfaces;
a first and a second transmission link for mechanical transmission of movements of the first and second control surfaces to the sensor, the first and second transmission links coupled with each other mechanically and via the sensor and one or more rotatively movable coupling elements, wherein the monitoring of the sensor system includes monitoring a difference between the movements transmitted by the first and second transmission links and detecting a breakage of one of the first and second transmission links, and wherein different desired travel distances are compensated by corresponding different transmission ratios of the movements transmitted by the first and second transmission links to one or more coupling elements.

* * * * *